United States Patent
Sonoda et al.

(10) Patent No.: US 9,634,885 B2
(45) Date of Patent: Apr. 25, 2017

(54) CONTROL TARGET FLOW SPECIFYING METHOD AND CONTROL TARGET FLOW SPECIFYING DEVICE

(71) Applicant: FUJITSU LIMITED, Kawasaki-shi, Kanagawa (JP)

(72) Inventors: Masataka Sonoda, Kawasaki (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 14/560,183

(22) Filed: Dec. 4, 2014

(65) Prior Publication Data

US 2015/0085642 A1 Mar. 26, 2015

Related U.S. Application Data

(63) Continuation of application No. PCT/JP2012/067005, filed on Jul. 3, 2012.

(51) Int. Cl.
  *G01R 31/08* (2006.01)
  *G06F 15/173* (2006.01)
  (Continued)

(52) U.S. Cl.
  CPC .......... *H04L 41/0654* (2013.01); *H04L 45/28* (2013.01)

(58) Field of Classification Search
  CPC .............. H04L 12/4641; H04L 67/141; H04L 41/0654; H04L 12/24; H04L 45/28; H04L 41/0677; H04L 41/08; H04L 41/18; H04L 45/58; H04L 45/70; H04L 45/72; H04L 45/74; H04L 47/00; H04L 49/70; H04L 43/0882; H04L 47/10; H04L 47/22; H04L 47/11; H04L 47/12; H04L 47/762; H04L 47/25; H04L 47/50; H04L 12/5689; H04L 49/50; H04L 49/25; H04L 12/923; H04L 12/911; H04L 47/783; H04L 12/801
  (Continued)

(56) References Cited

U.S. PATENT DOCUMENTS 8,804,523 B2 * 8/2014 Kim ..................... H04L 47/11
                                        370/235
8,943,499 B2 * 1/2015 Turner .................. H04L 41/12
                                        718/1
(Continued)

FOREIGN PATENT DOCUMENTS

JP  2000-244521  9/2000
JP  2007-517446  6/2007
(Continued)

OTHER PUBLICATIONS

International Search Report mailed Aug. 14, 2012 in corresponding International Application PCT/JP2012/067005.

*Primary Examiner* — Hanh N Nguyen
(74) *Attorney, Agent, or Firm* — Staas & Halsey LLP

(57) ABSTRACT

A computer-readable recording medium stores therein a program for causing a computer to execute a process. The process includes detecting a failure of a flow indicating a route on a network through which data of each tenant service provided by a tenant via a network flows; and specifying a control target flow influenced from the flow in which the failure has been detected based on association information in which each tenant service is associated with a flow of each tenant service.

4 Claims, 14 Drawing Sheets

(51) Int. Cl.
*H04L 12/24* (2006.01)
*H04L 12/703* (2013.01)
(58) Field of Classification Search
USPC .. 370/216–220, 395.21, 389, 400, 242, 241, 370/250; 709/203, 226, 227, 228, 224
See application file for complete search history.

(56) References Cited

U.S. PATENT DOCUMENTS

| | | |
|---|---|---|
| 9,306,853 B2* | 4/2016 | Wang .................... H04L 47/10 |
| 9,450,873 B2* | 9/2016 | Greenberg ............ H04L 47/623 |
| 2005/0147035 A1 | 7/2005 | Sylvain et al. |
| 2008/0228932 A1 | 9/2008 | Monette et al. |
| 2015/0103646 A1* | 4/2015 | Tourrilhes ............. H04L 47/125 |
| | | 370/229 |
| 2015/0172193 A1* | 6/2015 | Sinha .................... H04L 47/12 |
| | | 370/230 |

FOREIGN PATENT DOCUMENTS

| | | |
|---|---|---|
| JP | 2010-521857 | 6/2010 |
| JP | 2011-188422 | 9/2011 |

* cited by examiner

FIG.3

| FLOW | FLOW CONDITION | | MONITORING INFORMATION | | |
|---|---|---|---|---|---|
| | TRANSMIS-SION SOURCE | DESTINATION | NUMBER OF PACKETS | AMOUNT OF DATA | ... |
| FLOW A | * | VM11 | 48,287 | 323,345 | |
| FLOW B | * | VM12 | 12,265 | 8,067 | |
| FLOW C | App_X_1 | St1 | 30,123 | 290,328 | |
| ... | | | ... | ... | ... |

FIG.4

```
<Graph>
  <CISet>
    <CI id="sw1" item="SW"/>
    <CI id="sw2" item="SW"/>
    <CI id="sw3" item="SW"/>
    <CI id="pm1" item="PM"/>
    <CI id="pm2" item="PM"/>
    <CI id="vm11" item="VM"/>
    <CI id="vm12" item="VM"/>
    <CI id="vm21" item="VM"/>
    <CI id="App_X_1" item="App"/>
    <CI id="App_X_2" item="App"/>
    <CI id="App_Y" item="App"/>
    <CI id="st1" item="Storage"/>
    <CI id="st2" item="Storage"/>
    <CI id="tntX" item="Service"/>
    <CI id="tntY" item="Service"/>
    <CI id="cl1" item="Client"/>
    <CI id="cl2" item="Client"/>
  </CISet>

<RelSet>
    <Relation id="r1" src="sw1" dst="pm1"/>
    <Relation id="r2" src="sw1" dst="pm2"/>
    <Relation id="r3" src="sw2" dst="pm1"/>
    <Relation id="r4" src="sw2" dst="pm2"/>
    <Relation id="r5" src="pm1" dst="vm11"/>
    <Relation id="r6" src="pm1" dst="vm12"/>
    <Relation id="r7" src="pm2" dst="pm21"/>
    <Relation id="r8" src="vm11" dst="app_X_1"/>
    <Relation id="r9" src="vm12" dst="app_Y"/>
    <Relation id="r10" src="vm21" dst="app_X_2"/>
    <Relation id="r11" src="app_X_1" dst="tntX"/>
    <Relation id="r12" src="app_Y" dst="tntY"/>
    <Relation id="r13" src="app_X_2" dst="tntX"/>
    <Relation id="r14" src="st1" dst="tntX"/>
    <Relation id="r15" src="st2" dst="tntY"/>
    <Relation id="r16" src="cl1" dst="app_X_1"/>
    <Relation id="r17" src="cl1" dst="app_Y"/>
    <Relation id="r18" src="cl2" dst="app_X_2"/>
    <Relation id="r19" src="sw2" dst="sw3"/>
    <Relation id="r20" src="sw3" dst="st1"/>
    <Relation id="r21" src="sw3" dst="st2"/>
  </RelSet>
</Graph>
```

| FLOW | TENANT SERVICE | TRANS-MISSION SOURCE | DESTI-NATION | STATISTICAL INFORMATION | | |
|---|---|---|---|---|---|---|
| | | | | NUMBER OF RECEIVED PACKETS | AMOUNT OF RECEIVED DATA | ... |
| FLOW A | TENANT SERVICE X | * | VM11 | 48,287 | 323,345 | |
| FLOW B | TENANT SERVICE X | * | VM12 | 12,265 | 8,067 | |
| FLOW C | TENANT SERVICE Y | App_X_1 | St1 | 30,123 | 290,328 | |
| ... | | | | ... | ... | ... |

FIG.8

| FLOW | FLOW CONDITION | | TENANT SERVICE |
| --- | --- | --- | --- |
| | TRANSMIS-SION SOURCE | DESTINATION | |
| FLOW A | cl1 | app_x_1 | tntX |
| FLOW B | cl2 | app_y | tntY |
| FLOW C | app_x_1 | st1 | tntX |
| FLOW D | app_y | st2 | tntY |
| FLOW E | cl1 | app_x_2 | tntX |
| FLOW F | app_x_2 | st1 | tntX |

CONTROL TARGETS ARE AS FOLLOWS:

■FLOWS CORRESPONDING TO tntX: FLOW A, FLOW C, FLOW E, AND FLOW F
■FLOWS CORRESPONDING TO tntY: FLOW B AND FLOW D

CONTROL TARGET FLOW SPECIFYING METHOD AND CONTROL TARGET FLOW SPECIFYING DEVICE

CROSS-REFERENCE TO RELATED APPLICATIONS

This application is a continuation of International Application No. PCT/JP2012/067005, filed on Jul. 3, 2012, the entire contents of which are incorporated herein by reference.

FIELD

The embodiments discussed herein are related to a control target flow specifying program, a control target flow specifying method, and a control target flow specifying device.

BACKGROUND

In recent years, large-scale systems represented by a cloud have been operated. For example, a data center runs various types of systems on a number of physical server or virtual machines operating on physical servers, and provides various kinds of services.

Meanwhile, in the large-scale system in which a plurality of systems are operated, there are cases in which when a failure occurs in a certain service due to a trouble, a setting error, or the like, the failure is widely spread. For example, in the large-scale system, there are cases in which as a failure occurs, a large amount of data such as inquiries are simultaneously transmitted from clients, and as burst traffic occurs, the failure is widely spread. Since the data center has a number of users, when a failure is widely spread, a number of users are affected. As a technique of localizing the occurrence of a failure in the large-scale system, known is a technique of controlling network traffic other than a system side in which a trouble has occurred. For example, there is a technique of controlling a flow in which a failure has occurred using a technique of controlling a network in units of flows such as an open flow.

Patent Literature 1: Japanese National Publication of International Patent Application No. 2007-517446

Patent Literature 2: Japanese National Publication of International Patent Application No. 2010-521857

However, in the large-scale system, when burst traffic occurs, a flow different from a flow in which a failure has originally occurred may be affected, and it may be difficult to prevent a failure from being widely spread only by controlling the flow in which the failure has occurred.

A control target flow specifying program according to the present disclosure causes a computer to execute a process of detecting a failure of a flow indicating a route on a network through which data of each tenant service provided by a tenant via a network flows. Further, the control target flow specifying program causes the computer to execute a process of specifying a control target flow influenced from the flow in which the failure has been detected based on association information in which each tenant service is associated with a flow of each tenant service.

SUMMARY

According to an aspect of an embodiment, a computer-readable recording medium stores therein a program for causing a computer to execute a process. The process includes detecting a failure of a flow indicating a route on a network through which data of each tenant service provided by a tenant via a network flows; and specifying a control target flow influenced from the flow in which the failure has been detected based on association information in which each tenant service is associated with a flow of each tenant service.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an exemplary data configuration of flow information.

FIG. 4 is a diagram illustrating exemplary configuration management information stored in a CMDB.

FIG. 8 is a diagram illustrating examples of a flow and a tenant service of a corresponding flow.

DESCRIPTION OF EMBODIMENTS

Preferred embodiments of the present invention will be explained with reference to accompanying drawings. The invention is not limited by the following embodiments. The following embodiments can be appropriately combined as long as processing content thereof is contrary to each other.

[a] First Embodiment

Figure 1:
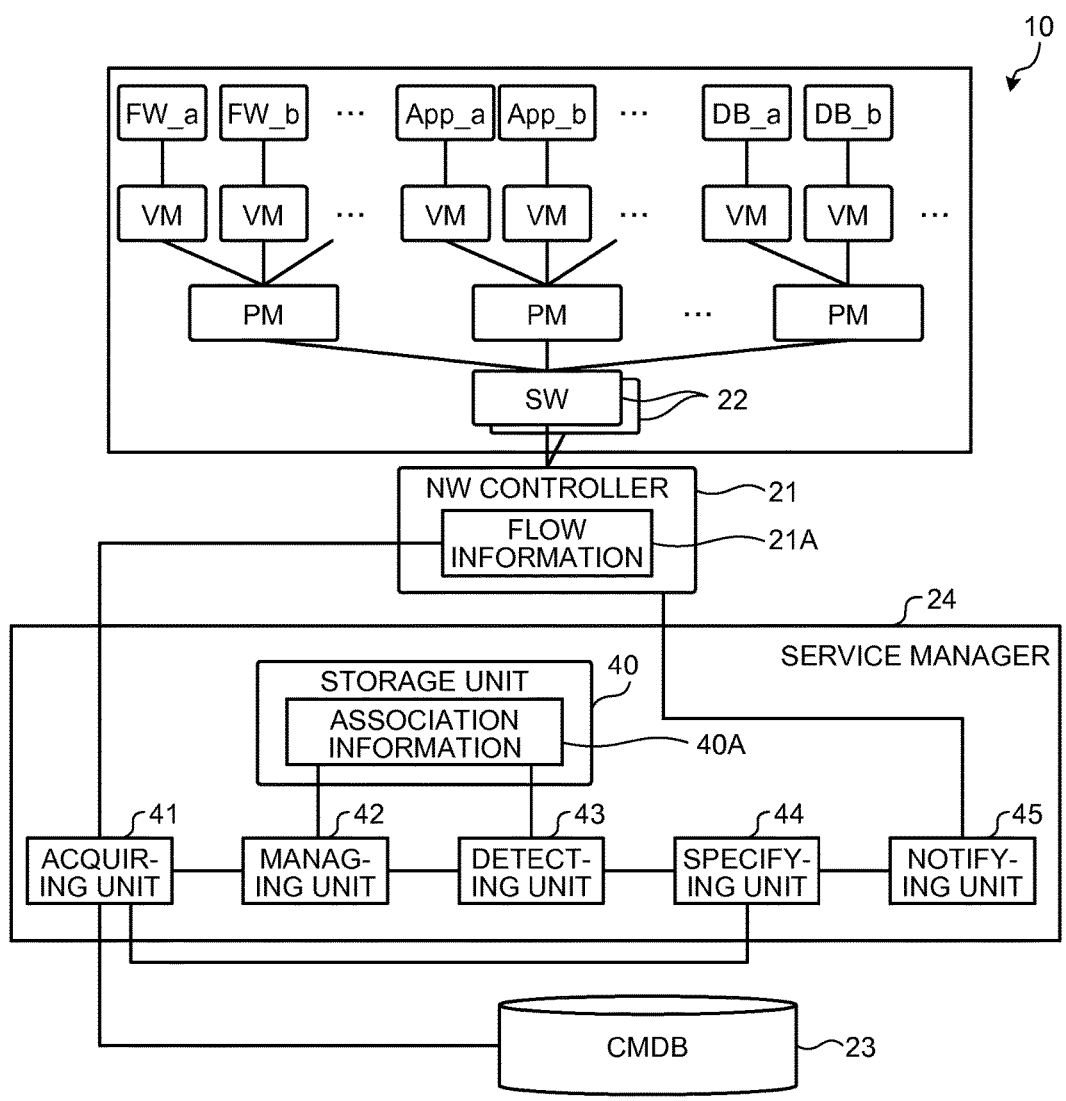
FIG. 1 is a diagram schematically illustrating a configuration of a data center.

A first embodiment will be described. The first embodiment will be described in connection with an example of a data center 10 in which a plurality of systems are operated. FIG. 1 is a diagram schematically illustrating a configuration of a data center. The data center 10 operates various kinds of software on physical servers or virtual machines operating on physical servers so that a system can be constructed. In the example of FIG. 1, "PM" indicates a physical server. "VM" indicates a virtual machine operating on a physical server. "FW_a" and "FW_b" indicate firewalls operating on virtual machines. "App_a" and "Ap_b" indicate applications operating on virtual machines. "DB_a" and "DB_b" indicate databases operating on virtual machines. The data center 10 includes a network (NW) controller 21, a plurality of switches (SWs) 22, a configuration management database (CMDB) 23, and a service manager 24. In the present embodiment, for example, the service manager 24 corresponds to a control target flow specifying device.

The data center 10 operates various kinds of software on physical servers or virtual machines operating on physical servers to construct a system of each tenant, and provides a service of each tenant. The tenant refers to a user such as a company or an individual that provides its own service using an environment of the data center 10. In order to be distinguished from a service or the like provided by an operating system (OS) or the like, a service provided by a tenant is referred to as a "tenant service." The tenant service refers to a function that is provided to the user through processing of a system run by each tenant, and is a concept including all of a group of applications operating on a system run by a tenant.

Figure 2:
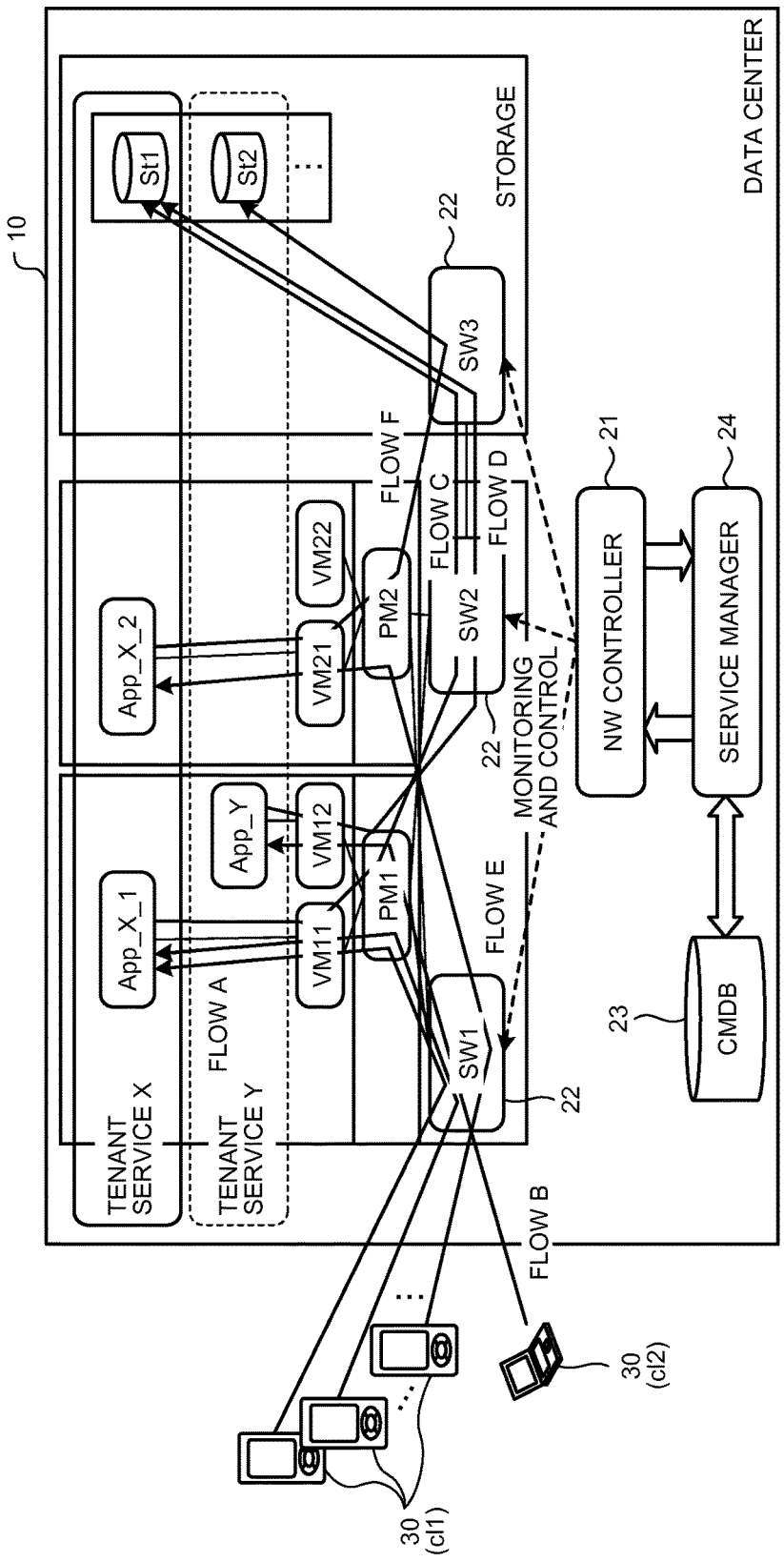
FIG. 2 is a diagram illustrating an exemplary tenant system a constructed in a data center.

FIG. 2 is a diagram illustrating an exemplary tenant system constructed in a data center. In the example of FIG. 2, virtual machines VM11 and VM12 operate on a physical server PM1, an application App_X_1 operates on the virtual machine VM11, and an application App_Y operates on the virtual machine VM12. Further, in the example of FIG. 2, virtual machines VM21 and VM22 operate on a physical server PM2, and an application App_X_2 operates on the virtual machine VM21. Furthermore, in the example of FIG. 2, a storage installed in the data center 10 is virtualized into a storage st1 and a storage st2.

The data center 10 is connectable with various kinds of client devices 30 via a network, and provides the tenant services by the tenants to the client devices 30. In the example of FIG. 2, the data center 10 provides a tenant service X by a tenant X through the application App_X_1 operating on the virtual machine VM11, the application App_X_2 operating on the virtual machine VM21, and the storage st1. Further, the data center 10 provides a tenant service Y by a tenant Y through the application App_Y operating on the virtual machine VM12 and the storage st2.

For example, the data center 10 according to the present embodiment sets communication specified by a transmission source and a destination as a flow using a technique such as the open flow, and controls data flowing through a network in units of flows. In the example of FIG. 2, a flow A indicates communication from the client device 30 to the application App_X_1. A flow B indicates communication from the client device 30 to the application App_Y. A flow C indicates communication from the application App_X_1 to the storage st1. A flow D indicates communication from the application App_Y to the storage st1. A flow E indicates communication from the client device 30 to the application App_X_2. A flow F indicates communication from the application App_X_2 to the storage st2.

Referring back to FIG. 1, the NW controller 21 is a device that performs route control such as a server computer. The NW controller 21 stores various kinds of conditions such as a transmission source and a destination of communication serving as a flow and a way of dealing with data flowing through a flow as flow information 21A. The NW controller 21 delivers the flow information 21A to the each switch 22. Further, the NW controller 21 may be constructed on a virtual machine operating on a physical server.

FIG. 3 is a diagram illustrating an exemplary data configuration of flow information. As illustrated in FIG. 3, the flow information 21A includes items such as a flow, a flow condition, and monitoring information. In the flow condition item, items such as a transmission source and a destination are set. In the monitoring information item, the number of packets and an amount of data are set. The flow item is a region storing identification information identifying a flow. A flow is given identification information identifying a flow. The flow item stores identification information given to a flow. The transmission source item is a region storing information indicating a transmission source of data. The transmission source item stores "*" when a transmission source of data is not limited to a specific transmission source, and stores information indicating a transmission source when a transmission source of data is set as a condition. The destination item is a field storing information indicating a destination to which data received from a transmission source is transferred. The number of packets item is a field storing the number of packets of transferred data. The amount of data item is a field storing an amount of transferred data. In the present embodiment, in order to easily identify a destination and a transmission source set as a flow condition, corresponding components are described in the destination item and the transmission source item of the flow information 21A, but various kinds of pieces of identification information on a network are combined to set a destination and a transmission source. For example, in the destination item and the transmission source, a destination and a transmission source are set by a combination of a media access control (MAC) address, an Internet protocol (IP) address, a port number, and the like.

In the example of FIG. 3, in the flow A, a transmission source of data is not limited to a specific transmission source, a destination of data is the virtual machine VM11, the number of received packets is 48,287, and an amount of received data is 323,345. Further, in the flow B, a transmission source of data is not limited to a specific transmission source, a destination of data is the virtual machine VM12, the number of received packets is 12,265, and an amount of received data is 8,067. Furthermore, in the flow C, a transmission source of data is the application App_X_1, a destination of data is the storage st1, the number of received packets is 30,123, and an amount of received data is 290,328.

Referring back to FIG. 1, the switch 22 is a communication device that performs data transfer. The switch 22 distributes data to a system of each tenant in units of flows according to a condition of the flow information 21A delivered from the NW controller 21. Thus, in the data center 10, the NW controller 21 can control data flowing via a network in units of flows by changing a condition of each flow set to the flow information 21A and delivering the flow information 21A to each switch 22.

Further, the switch 22 measures the number of packets and a data amount of passed data in units of flows, and notifies the NW controller 21 of the number of packets and the data amount. The NW controller 21 stores the notified number of packets and the data amount in the flow information 21A in units of flows.

The CMDB 23 stores configuration information of various kinds of systems in the data center 10. For example, the CMDB 23 stores information related to various kinds of components such as hardware or software of a system providing each tenant service and configuration management information such as a connection relation of components.

FIG. 4 is a diagram illustrating exemplary configuration management information stored in the CMDB. In the example of FIG. 4, the configuration management information is stored in an extensible markup language (XML) format, and data names of "Graph," "ClSet," and "RelSet"

are included as a tag. "Graph" is a tag used in a definition of the configuration management information. "ClSet" is a tag used in a definition of a component configuring a system. "RelSet" is a tag used in a definition of a connection relation of components.

A component is allocated a code identifying each component. In a tag part of "ClSet," a code indicating a component is described as Clid=" ", and a type of a component is described as item=" ". "SW" of a type indicates a switch. "PM" of a type indicates a physical server. "VM" of a type indicates a virtual machine. "App" of a type indicates an application. "Storage" of a type indicates a storage. "Service" of a type indicates a tenant service. "client" of a type indicates a client device.

In a tag part of "RelSet," a code identifying a connection relation is described as id=" ", and a code indicating a component in a connection relation is described as src=" " and dst=" ".

In the example of FIG. 4, "sw1" indicates a switch. "pm1" indicates a physical server. "vm11" indicates a virtual machine. "App_X_1" indicates an application. "tntX" indicates a tenant service. "cl1" indicates a client device. In the example of FIG. 4, a switch "sw1" and a physical server "pm1" are in a connection relation, and a code of a flow identifying a connection relation is "r1."

Referring back to FIG. 1, the service manager 24 is a device that detects a flow in which a failure has occurred and specifies a flow influenced from the flow in which the failure has occurred when the failure occurs in the network of the data center 10 such as a server computer. The service manager 24 may be constructed on a virtual machine operating on a physical server. The service manager 24 may be construct red on the same physical server or the same virtual machine as in the NW controller 21 or the like.

The service manager 24 includes a storage unit 40, an acquiring unit 41, a managing unit 42, a detecting unit 43, a specifying unit 44, and a notifying unit 45 as illustrated in FIG. 1.

The storage unit 40 stores various kinds of pieces of information. For example, the storage unit 40 stores association information 40A in which a tenant service is associated with a flow. Device examples of the storage unit 40 include a semiconductor memory in which data is rewritable such as a flash memory or a non volatile static random access memory (NVSRAM) and a storage device such as a hard disk or an optical disk.

Figures 5, 6:
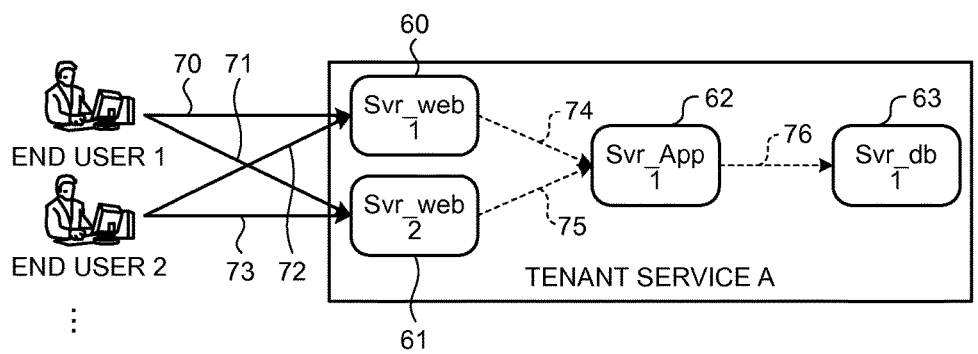
FIG. 5 is a diagram illustrating an exemplary data configuration of association information.
FIG. 6 is a diagram for describing an association of a flow and a tenant service.

FIG. 5 is a diagram illustrating an exemplary data configuration of the association information. The association information 40A includes items such as a flow, a tenant service, a transmission source, a destination, and statistical information as illustrated in FIG. 5. In the statistical information item, items such as the number of received packets and an amount of received data are set. The flow item is a field storing identification information allocated to a flow. The tenant service item is a field storing information indicating a tenant service associated with a flow. The transmission source item is a field storing information indicating a transmission source of data. In the transmission source item, "*" is stored when a transmission source of data is not limited to a specific transmission source, and information indicating a transmission source when a transmission source of data is set as a condition. The destination item is a field storing information indicating a destination of data flowing through a flow. The number of received packets item is a field storing the number of packets of data that has flown through a flow. The amount of received data item is a field storing an amount of received data of a flow.

In the example of FIG. 5, for the flow A, the tenant service X is associated, a transmission source of data is not limited to a specific transmission source, a destination of data is the virtual machine VM11, the number of received packets is 48,287, and an amount of received data is 323,345. Further, for the flow B, the tenant service X is associated, a transmission source of data is not limited to a specific transmission source, a destination of data is the virtual machine VM12, the number of received packets is 12,265, and an amount of received data is 8,067. Furthermore, for the flow C, a tenant service Y is associated, a transmission source of data is the application App_X_1, a destination of data is the storage st1, the number of received packets is 30,123, and an amount of received data is 290,328.

Referring back to FIG. 1, the acquiring unit 41 acquires various kinds of pieces of information. For example, the acquiring unit 41 acquires the flow information 21A from the NW controller 21. The flow information 21A may be acquired such that the flow information 21A is periodically delivered from the NW controller 21 to the service manager 24 and received by the service manager 24. Further, the flow information 21A may be acquired such that the service manager 24 refers to the NW controller 21 via a network. The acquiring unit 41 acquires the configuration management information of each tenant service provided in the data center 10 from the CMDB 23.

The managing unit 42 performs various kinds of managements. For example, the managing unit 42 manages data of the association information 40A. When the flow information 21A acquired by the acquiring unit 41 includes a flow that is not registered in the association information 40A, the managing unit 42 obtains a tenant service using data of the unregistered flow based on the configuration management information. Then, the managing unit 42 registers the unregistered flow and the obtained tenant service in the association information 40A in association with each other.

Here, an association of a flow and a tenant service is described. FIG. 6 is a diagram for describing an association of a flow and a tenant service. As illustrated in FIG. 6, for example, a system is assumed to be constructed by four servers 60 to 63, and a tenant service A of a tenant A is assumed to be provided to an end user. Svr_web1 and Svr_web2 indicate web servers. Svr_app1 indicates an application server. Svr_db1 indicates a database server. Data related to the tenant service A flow through flows 70 to 76 serving as communication among the servers 60 to 63 and communication between the servers 60 and 61 and the end users. Thus, the tenant service A is associated with each of the flows 70 to 76.

Figure 7:
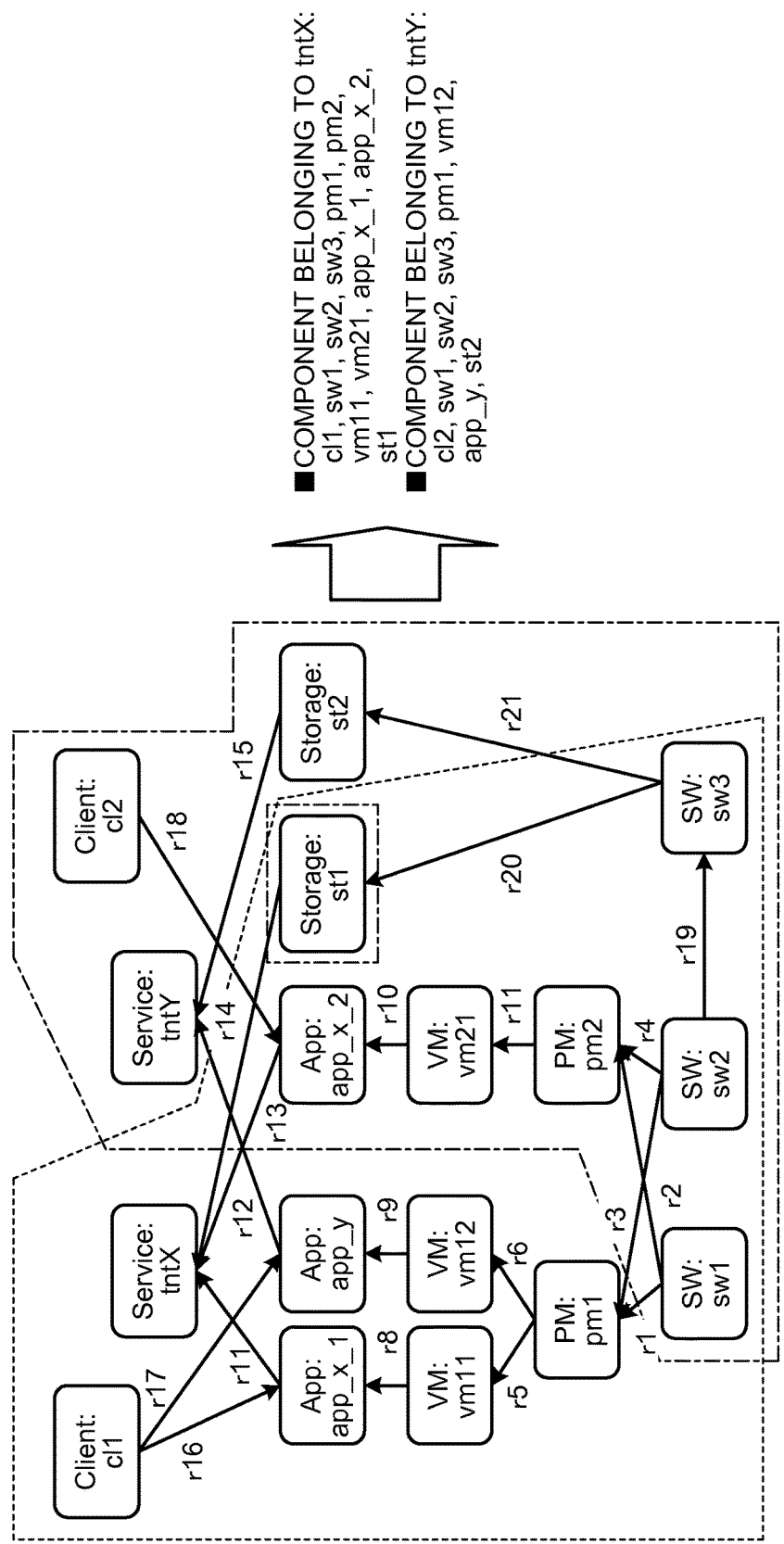
FIG. 7 is a diagram schematically illustrating a connection relation of components of a tenant.

For example, when the flow information 21A acquired by the acquiring unit 41 includes a flow that is not registered in the association information 40A, the managing unit 42 traces a connection relation of components stored in the configuration management information, and specifies a component used in each tenant service FIG. 7 is a diagram schematically illustrating a connection relation of components of a tenant. FIG. 7 is a diagram schematically illustrating a connection relation of components of a tenant based on the connection relation of the components of the configuration management information illustrated in FIG. 4. For example, in FIG. 7, a switch sw1 and a physical server pmt are in a connection relation by a flow r1. The managing unit 42 traces components described in src in order from tenant services tntX and tntY based on the connection relation of the components of the configuration management information illustrated in FIG. 4, and specifies components used in the tenant services tntX and tntY as illustrated in FIG. 7.

Further, the managing unit 42 specifies a tenant service including components of a transmission source and a destination of an unregistered flow together. FIG. 8 is a diagram illustrating examples of a flow and a tenant service of a corresponding flow. FIG. 8 illustrates a result of specifying a flow and a tenant service including components of a transmission source and a destination of a flow together from the connection relation illustrated in FIG. 7. In the example of FIG. 8, for the flow A, a client device cl1 serving as a transmission source of data and an application App_X_1 serving as a destination of data are included as components of the tenant service tntX, and thus the tenant service tntX is specified as an associated tenant service. Further, for the flow B, a client device cl2 serving as a transmission source of data and an application App_Y serving as a destination of data are included as components of the tenant service tntY, and thus the tenant service tntY is specified as an associated tenant service.

The managing unit 42 registers an unregistered flow and a specified tenant service in the association information 40A in association with each other. Further, the managing unit 42 updates the number of packets and a data amount of each flow stored in the association information 40A based on the flow information 21A acquired by the acquiring unit 41.

The detecting unit 43 performs various kinds of detection operations. For example, the detecting unit 43 detects a flow in which a failure has occurred. The detecting unit 43 monitors the number of packets and a data amount of each flow stored in the association information 40A, and detects a flow in which at least one of the number of packets and the data amount is increased to be larger than a certain allowable value at which burst traffic is regarded to have occurred during a certain period of time. A period of time appropriate for monitoring traffic of a flow may be set as the certain period of time. The certain period of time may be set for each tenant service or for each flow. The allowable value may be set for each tenant service or for each flow as well. Further, the certain period of time may change according to a time or the like.

Meanwhile, when a failure has occurred in a certain flow, there are cases in which a failure occurs in another flow due to influence of the flow in which the failure has occurred although data of the flow in which the failure has occurred is controlled.

The specifying unit 44 performs various kinds of specifying operations. For example, when the detecting unit 43 detects a flow in which a failure has occurred, the specifying unit 44 specifies a flow of a control target influenced from the flow in which the failure has occurred.

Figure 9:
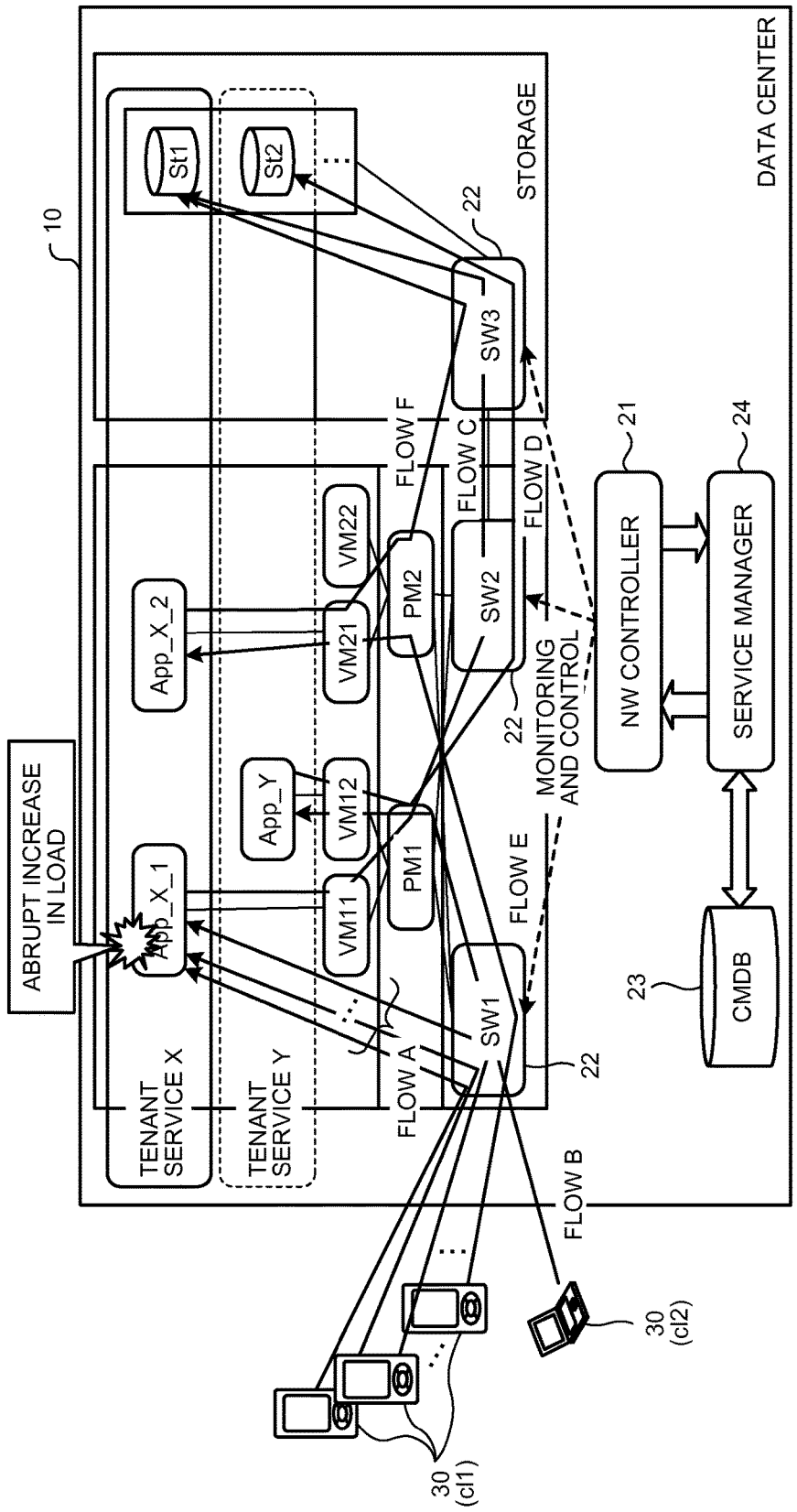
FIG. 9 is a diagram illustrating an exemplary failure.
Figure 10:
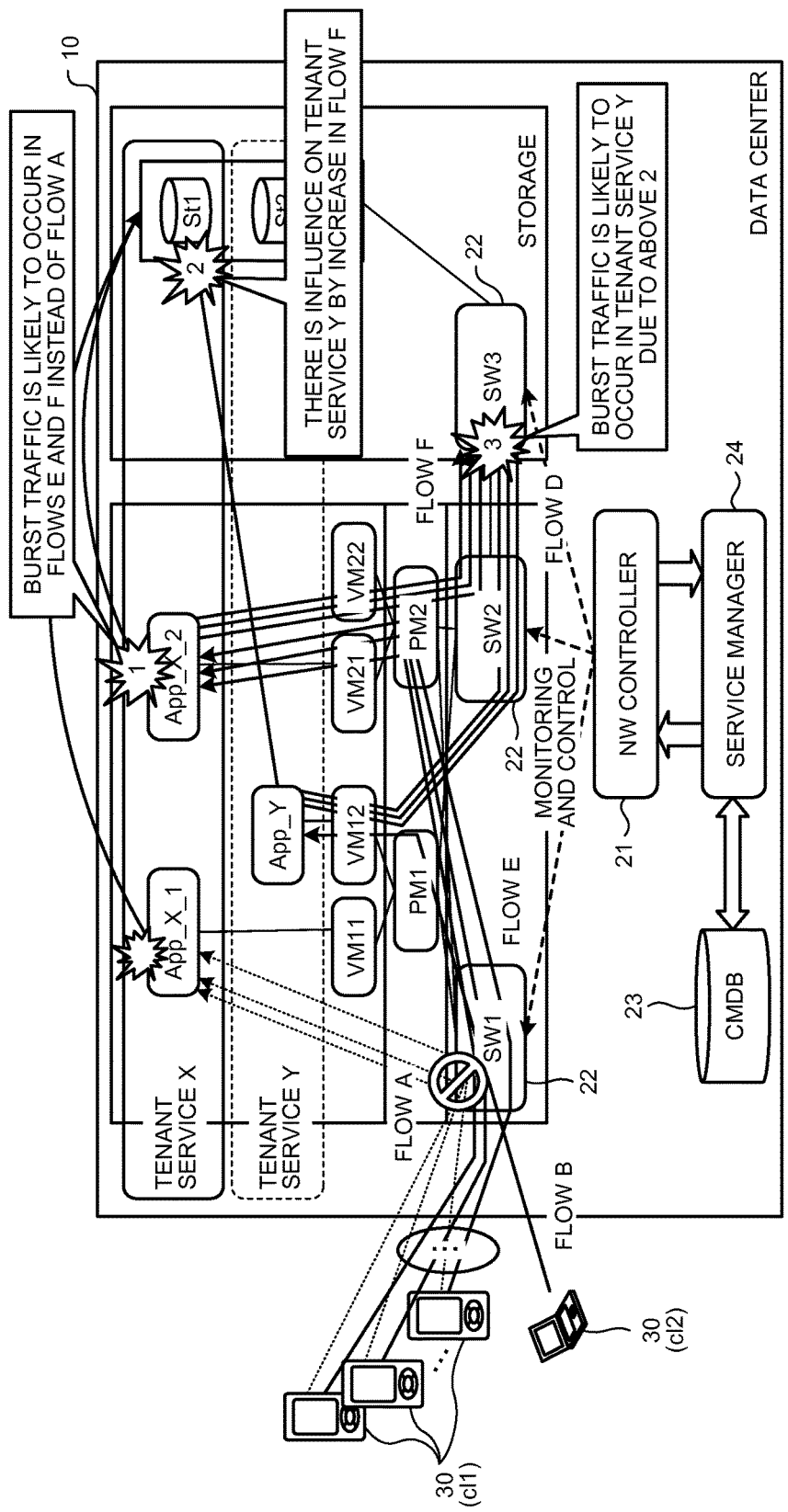
FIG. 10 is a diagram illustrating a state in which a flow A is blocked.

FIG. 9 is a diagram illustrating an exemplary failure. FIG. 9 illustrates an example in which burst traffic has occurred in the flow A of the tenant service X. In this case, there are cases in which as burst traffic has occurred in the flow A, a processing load of the application App_X_1 is increased, and a failure occurs in the tenant service X. For example, in order to the burst traffic of the flow A, the flow A is blocked so that data does not flow through the flow A. FIG. 10 is a diagram illustrating a state in which the flow A is blocked. As illustrated in FIG. 10, there are cases in which as the flow A is blocked, burst traffic occurs in another flow E or another flow F of the tenant service X using data of the flow A. Further, there are cases in which as the burst traffic has occurred in the flow F, the processing load of the switch SW3 or the storage st1 is increased, and burst traffic occurs in the flow D of the tenant service Y using the switch SW3 or the storage st2.

In this regard, the specifying unit 44 specifies a flow in which a failure has been detected and all other flows of the same tenant service as control target flows based on the association information 40A. For example, the specifying unit 44 obtains a tenant service of a flow in which a failure has been detected from the tenant service item of the association information 40A. Then, the specifying unit 44 specifies another flow in which the obtained tenant service is set to the tenant service item of the association information 40A as a control target flow. In the example of FIG. 9, the specifying unit 44 specifies other flows C, E, and F of the tenant service X using data of the flow A in which the failure has occurred as the control target flows.

Further, the specifying unit 44 specifies a flow of another tenant service passing through components of a tenant service using data of the flow in which the failure has been detected as the control target flow based on the configuration management information and the flow information 21A. For example, the specifying unit 44 specifies components shared by another tenant service among components of the tenant service using data of the flow in which the failure has been detected based on the configuration management information. Then, the specifying unit 44 obtains another tenant service passing through the components shared by another tenant service from the flow information 21A, and specifies the obtained flow as the control target flow. In FIG. 9, the specifying unit 44 specifies the flow B of the tenant service Y passing through the physical server PM1 and the switch SW1 serving as the components of the tenant service X as the control target flow. Further, the specifying unit 44 specifies the flow D of the tenant service Y passing through the physical server PM1 and the switches SW2 and SW3 as the control target flow.

Figure 11:
FIG. 11 is a diagram illustrating an exemplary notification screen in which a notification is given to an administrator.

The notifying unit 45 performs various kinds of notifying operations. For example, the notifying unit 45 notifies the NW controller 21 of the flow in which the failure has been detected and the specified control target flow. In the example of FIG. 9, the notifying unit 45 notifies the NW controller 21 of the flows A to F. Further, the notifying unit 45 may notify the administrator of the data center 10 of the flow in which the failure has been detected and the specified control target flow. FIG. 11 is a diagram illustrating an exemplary notification screen in which a notification is given to the administrator. In the example of FIG. 11, the flow A in which the failure has been detected and the flows B to F of the specified control target are set as the control target.

In the example of FIG. 1, a functional configuration is illustrated, and thus the service manager 24 is divided into the processing units of the acquiring unit 41, the managing unit 42, the detecting unit 43, the specifying unit 44, and the notifying unit 45, but, for example, the processing units may be integrated into a single device. As an exemplary device, there is an electronic circuit such as a central processing unit (CPU) or a micro processing unit (MPU). Further, as the device, an integrated circuit (IC) such as an application specific integrated circuit (ASIC) or a field programmable gate array (FPGA) may be employed.

Figure 12:
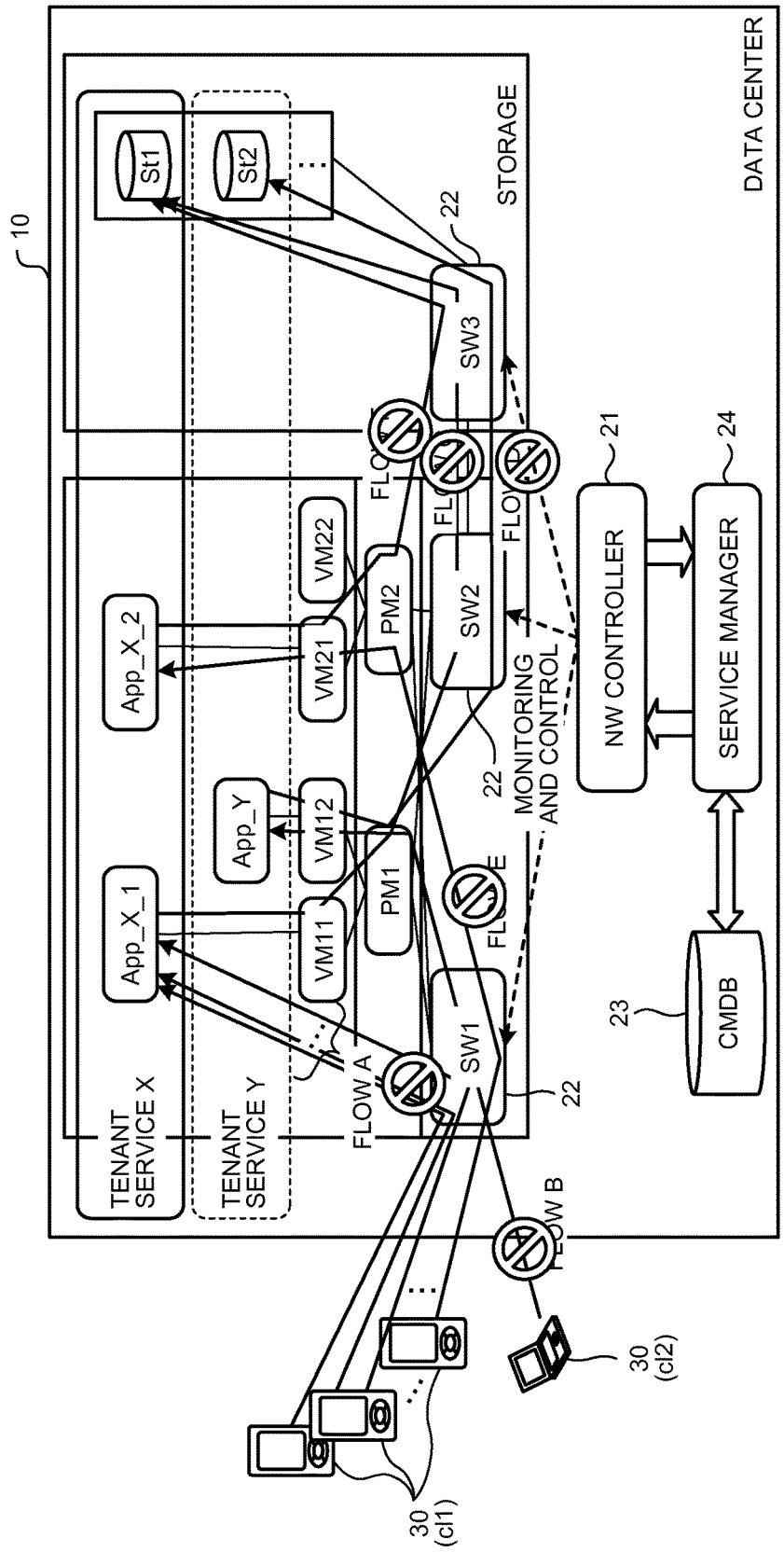
FIG. 12 is a diagram illustrating a state in which flows A to F are blocked.

The NW controller 21 controls a flow notified from the notifying unit 45. For example, the NW controller 21 temporarily blocks communication of a notified flow. FIG. 12 is a diagram illustrating a state in which the flows A to F are blocked. As illustrated in FIG. 12, since the flows A to F are blocked, even when burst traffic occurs in any one of the flows B to F influenced from the occurrence of the failure of the flow A, it is possible to suppress influence on other flows and suppress the failure from being widely spread.

The NW controller 21 monitors an amount of data to be transmitted to the blocked flow, monitors a communication recovery situation, and steadily recovers communication of the blocked flow when a data amount falls within a normal range. The present embodiment has been described in connection with the example in which the NW controller 21 performs control such that the flow notified by the notifying unit 45 is blocked, but the present invention is not limited to this example. For example, the NW controller 21 may perform control such that a band of a notified flow is limited to a range in which there is no influence on other flows.

Figure 13:
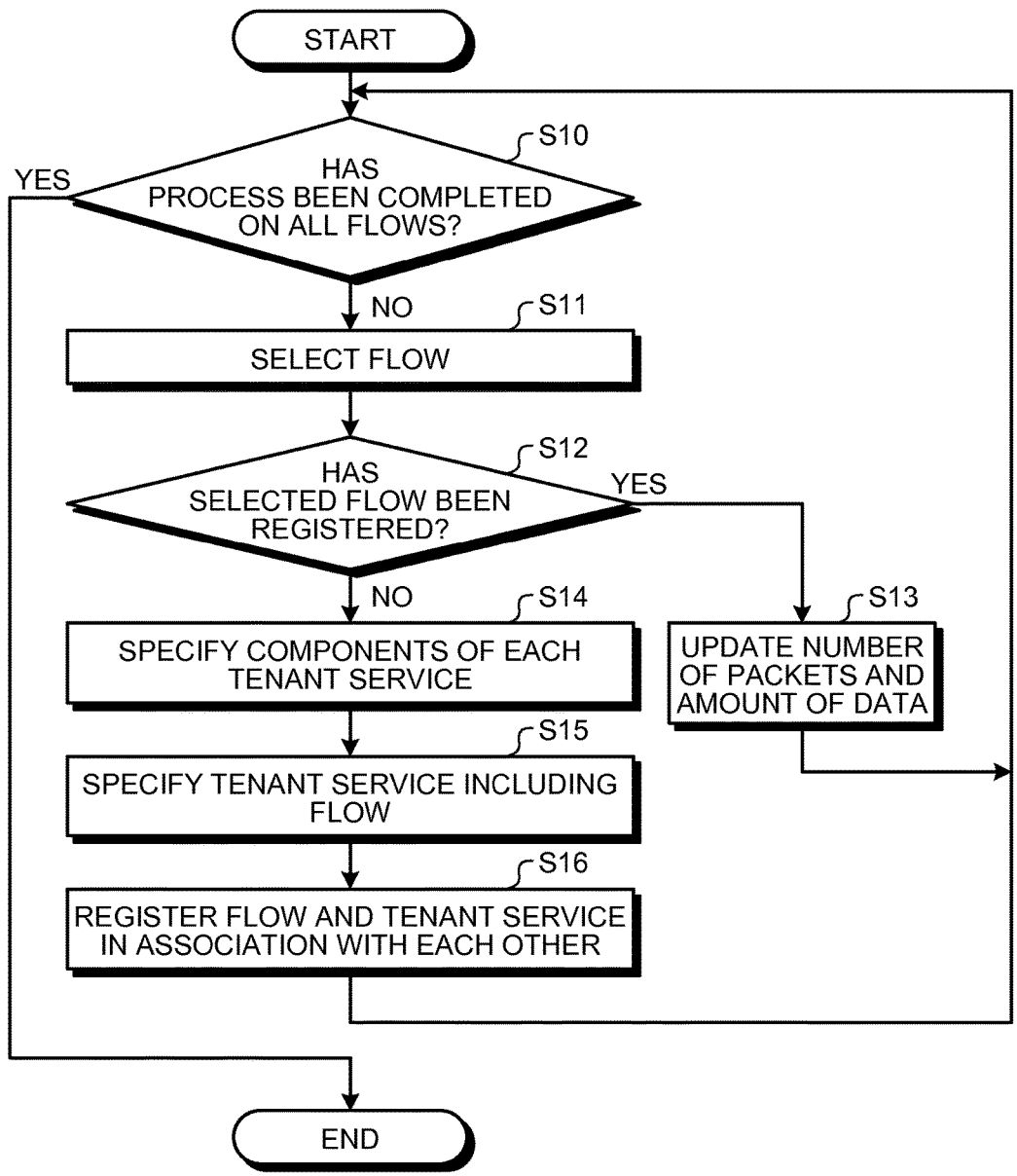
FIG. 13 is a flowchart illustrating a management process.

Next, the description will proceed with the flow of a management process in which the service manager 24 according to the present embodiment manages data of the association information 40A based on the flow information 21A. FIG. 13 is a flowchart illustrating a management process. For example, the management process is performed at a certain timing, for example, at a timing at which the flow information 21A is acquired.

As illustrated in FIG. 13, the managing unit 42 determines whether or not the process has been completed on all flows of the flow information 21A (S10). When the process has been completed on all flows (Yes in S10), the process ends.

However, when there is any one flow that is not completed (No in S10), the managing unit 42 selects a non-processed flow (S11). The managing unit 42 determines whether or not the selected flow has been registered in the association information 40A (S12). When the selected flow has been registered in the association information 40A (Yes in S12), the managing unit 42 updates the number of packets and a data amount of the selected flow stored in the association information 40A (S13), and the process proceeds to S10.

However, when the selected flow has not been registered in the association information 40A (No in S12), the managing unit 42 traces the connection relation of the components stored in the configuration management information, and specifies components to be used in each tenant service (S14). Then, the managing unit 42 specifies tenant service components of a transmission source and a destination of an unregistered flow (S15). The managing unit 42 registers the number of packets and the data amount in the association information 40A in association with the selected flow and the specified tenant service (S16), and the process proceeds to S10.

Figure 14:
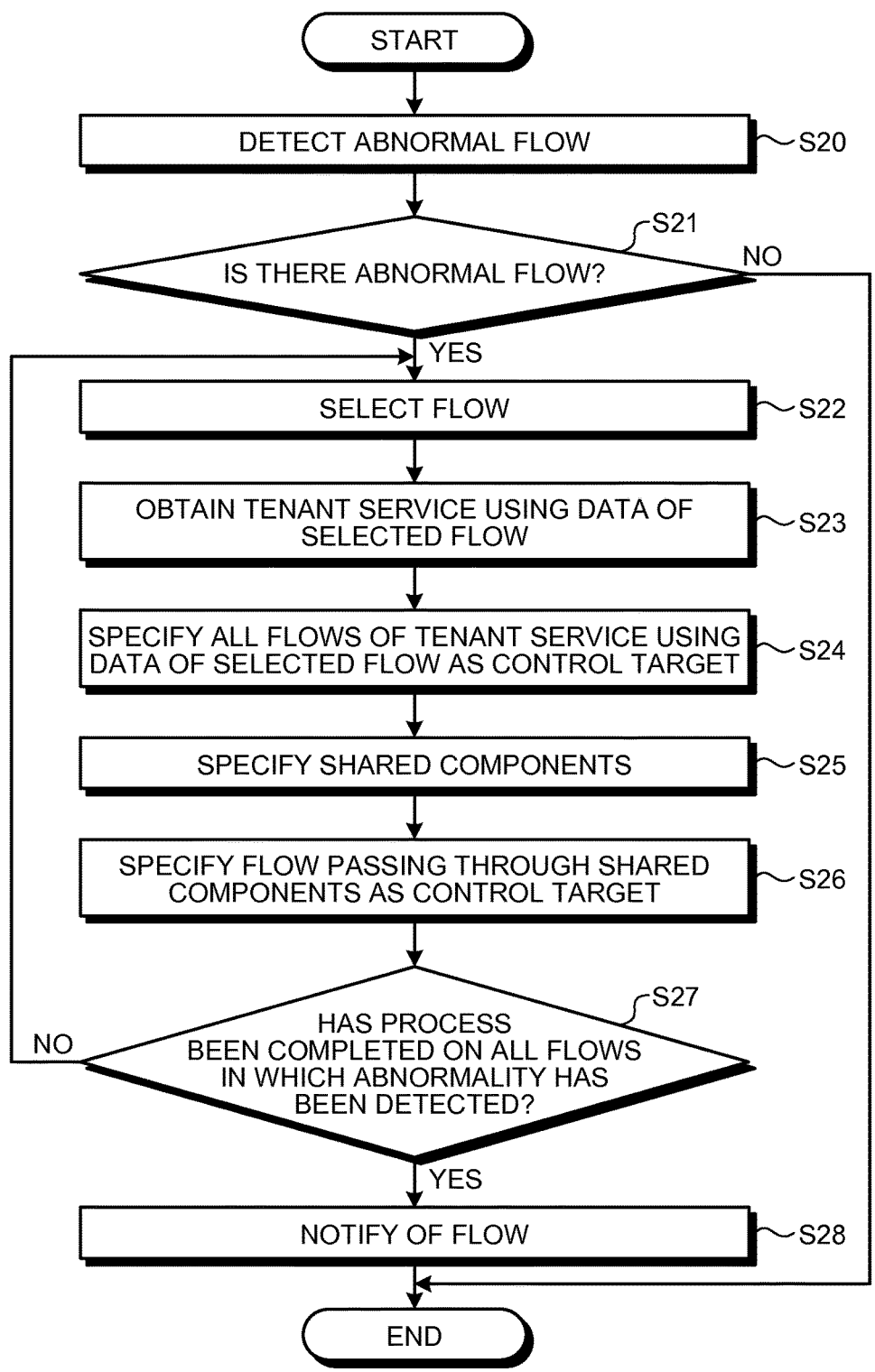
FIG. 14 is a flowchart illustrating a specifying process.

Next, the description will proceed with the flow of the specifying process in which the service manager 24 according to the present embodiment detects a flow in which a failure has occurred and specifies a control target flow influenced when the flow in which the failure has occurred is detected. FIG. 14 is a flowchart illustrating the specifying process. The specifying process is periodically performed. For example, the specifying process is performed at a timing at which the association information 40A acquired by the flow information 21A is updated.

As illustrated in FIG. 14, the detecting unit 43 detects a flow in which a failure has occurred (S20). The detecting unit 43 determines whether or not the flow in which the failure has occurred has been detected (S21). When the flow in which the failure has occurred has not been detected (No in S21), the process ends.

However, when the flow in which the failure has occurred has been detected (Yes in S21), the specifying unit 44 selects one flow in which a failure has occurred (S22). The specifying unit 44 obtains a tenant service using data of a flow selected from the tenant service item of the association information 40A (S23). Then, the specifying unit 44 specifies all other flows in which the obtained tenant service is set to the tenant service item of the association information 40A as the control target flows (S24).

Further, the specifying unit 44 specifies components shared by another tenant service among components of the tenant service using data of the selected flow based on the configuration management information (S25). Then, the specifying unit 44 obtains another flow passing through the components shared by another tenant service from the flow information 21A, and specifies the obtained flow as the control target flow (S26).

The specifying unit 44 determines whether or not the process has been completed on all flows in which a failure has been detected (S27). When there is any one flow that is not completed (No in S27), the process proceeds to S22. However, when the process has been completed on all the flows (Yes in S27), the notifying unit 45 notifies the NW controller 21 of the flow in which the failure has been detected and the specified control target flow (S28), and the process ends.

As described above, the service manager 24 stores the association information 40A in which each tenant service provided by a tenant via a network is associated with a flow indicating a route on a network through which data of each tenant service flows. Further, the service manager 24 detects a failure of a flow of each tenant service. Then, the service manager 24 specifies the control target flow influenced from the flow in which the failure has been detected based on the association information 40A. As described above, the service manager 24 can specify the control target flow and thus prevent the failure from being widely spread by controlling the control target flow.

Further, the service manager 24 specifies another flow of the same tenant service as the flow in which the failure has been detected as the control target flow based on the association information 40A. Through this operation, even when a failure occurs in another flow of the same tenant service as a flow in which a failure has been detected due to influence of the flow in which the failure has been detected, the service manager 24 can suppress the failure since another flow is specified as the control target flow.

Further, the service manager 24 specifies a flow of another tenant service passing through components of a tenant service using data of a flow in which a failure has been detected as the control target flow based on the configuration management information and the flow information 21A. Through this operation, even when a failure occurs in a flow of another tenant service passing through components of a tenant service using data of a flow in which a failure has been detected due to influence of the flow in which the failure has been detected, the service manager 24 can suppress the failure since the flow is specified as the control target flow.

[b] Second Embodiment

The embodiment related to the device of the disclosure have been described so far, but the technology of the disclosure can be implemented in various different from other than the above embodiment. In this regard, another embodiment of the present invention will be described below.

The above embodiment has been described in connection with the example in which the number of packets and a data amount of each flow are stored in the association information 40A, and the detecting unit 43 detects the occurrence of a failure based on the number of packets and the data amount stored in the association information 40A, but the device of the disclosure is not limited to this example. For example, the detecting unit 43 may detect the occurrence of a failure with reference to the number of packets and the data amount stored in the flow information 21A of the NW controller 21.

The above embodiment has been described in connection with the example in which the service manager 24 stores the association information 40A, but the device of the disclosure is not limited to this example. For example, another storage device or a computer may store the association information 40A, and the service manager 24 may perform the process with reference to the association information 40A stored in another storage device or the computer.

Further, the above embodiment has been described in connection with the example in which the NW controller 21 and the service manager 24 are separately installed, but the device of the disclosure is not limited to this example. For example, the function of the service manager 24 may be added to the NW controller 21, and the NW controller 21 may detect a flow in which a failure has occurred, specify a control target flow influenced from the flow in which the failure has occurred, and perform control.

Each component of each illustrated device is conceptually functional, and need not necessarily be configured physically as illustrated in the drawings. In other words, a specific form in which devices are distributed or integrated is not limited to an illustrated one, and all or some devices may be distributed or integrated functionally or physically in arbitrary units according to various kinds of loads, a utilization state, or the like. For example, the processing units of the acquiring unit 41, the managing unit 42, the detecting unit 43, the specifying unit 44, and the notifying unit 45 illustrated in FIG. 1 may be appropriately integrated. Further, all or some processing functions performed by the processing units may be implemented by a CPU and a program analyzed and executed by the CPU or may be implemented as hardware by a wired logic.

Control Target Flow Specifying Program

Figure 15:
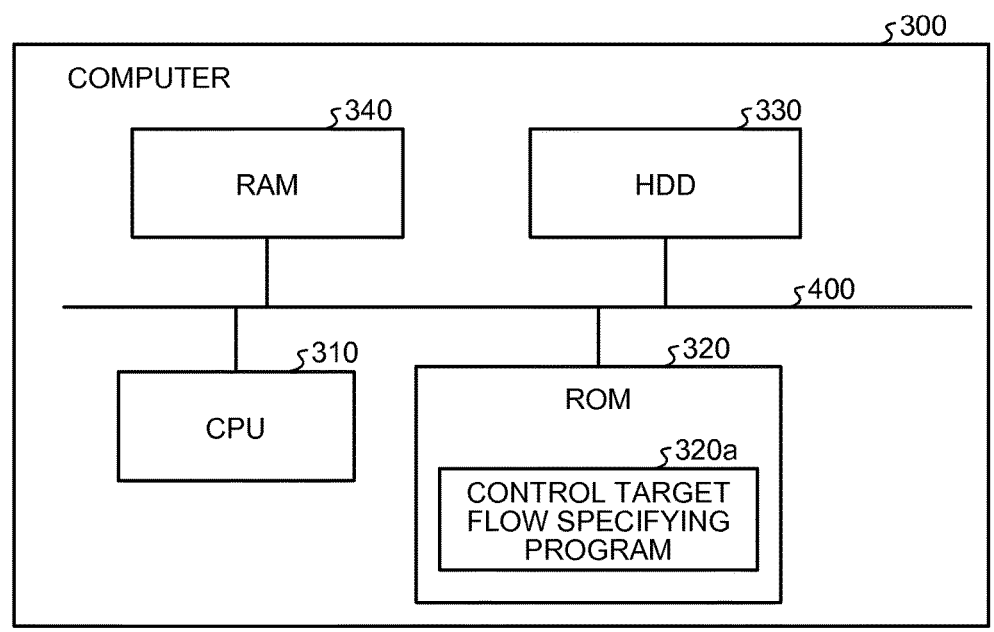
FIG. 15 is a diagram illustrating a computer that executes a control target flow specifying program.

Further, various kinds of processes described in the above embodiments can be implemented such that a prepared program is executed by a computer system such as a personal computer (PC) or a work station. In this regard, an exemplary computer system executing a program having the same function as in the above embodiments will be described below. FIG. 15 is a diagram illustrating a computer that executes a control target flow specifying program.

A computer 300 includes a CPU 310, a read only memory (ROM) 320, a hard disk drive (HDD) 330, and a random access memory (RAM) 340 as illustrated in FIG. 15. The components 310 to 340 are connected through a bus 400.

A control target flow specifying program 320a that performs the same functions as the processing units of the above embodiments is stored in the ROM 320 in advance. For example, the control target flow specifying program 320a that performs the same functions the acquiring unit 41, the managing unit 42, the detecting unit 43, the specifying unit 44, and the notifying unit 45 of the first embodiment is stored. The control target flow specifying program 320a may be appropriately separated.

The HDD 330 stores various kinds of data. For example, the HDD 330 stores various kinds of data such as the flow information and the association information.

The CPU 310 reads the control target flow specifying program 320a from the ROM 320, and executes the control target flow specifying program 320a so that the same operations of the processing units of the first embodiment are performed. In other words, the control target flow specifying program 320a performs the same operations as the acquiring unit 41, the managing unit 42, the detecting unit 43, the specifying unit 44, and the notifying unit 45 of the first embodiment.

The control target flow specifying program 320a need not necessarily be stored in the ROM 320 from the beginning. The control target flow specifying program 320a may be stored in the HDD 330.

For example, a program may be stored in a portable physical medium such as a floppy disk (FD), a compact disk read only memory (CD-ROM), a digital versatile disk (DVD), a magneto-optical disk, or an IC card that is inserted into the computer 300. Further, the computer 300 reads the program from the portable physical medium and executes the program.

Further, the program may be stored in another computer (or a server) connected with the computer 300 via a public line, the Internet, a local area network (LAN), a wide area network (WAN), or the like. Furthermore, the computer 300 reads the program from the computer (or the server) and executes the program.

It is possible to prevent a failure from being widely spread.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process, the process comprising:
   detecting a failure of a flow, included in a plurality of flows, on a network through which a plurality of tenants provide data for tenant services, wherein each of the tenant services is provided through at least one of the plurality of flows with which the each of the tenant services is associated via association information;
   identifying a first tenant that is associated with the flow with the detected failure, the flow with the detected failure including a source and a destination;
   identifying components associated with the first tenant based on the association information and located in the flow with the detected failure;
   identifying a second tenant which provides a tenant service via a second flow passing through at least one of the identified components; and
   specifying the second flow through which the second tenant provides the tenant service as a control target flow.

2. The non-transitory computer-readable recording medium according to claim 1,
   wherein the specifying of the control target flow includes specifying another flow of a same tenant service as the flow in which the failure has been detected as the control target flow based on the association information.

3. A control target flow specifying method, comprising:
   detecting, by a computer, a failure of a flow, included in a plurality of flows, on a network through which a plurality of tenants provide data for tenant services, wherein each of the tenant services is provided through at least one of the plurality of flows with which each of the tenant services is associated via association information;

identifying a first tenant that is associated with the flow with the detected failure, the flow with the detected failure including a source and a destination;

identifying components associated with the first tenant based on the association information and located in the flow with the detected failure;

identifying a second tenant which provides a tenant service via a second flow passing through at least one of the identified components; and specifying the second flow through which the second tenant provides the tenant service as a control target flow.

4. A control target flow specifying device comprising:
a processor that executes a process comprising:

detecting a failure of a flow, included in a plurality of flows, on a network through which a plurality of tenants provide data for tenant services, wherein each of the tenant services is provided through at least one of the plurality of flows with which each of the tenant services is associated via association information;

identifying a first tenant that is associated with the flow with the detected failure, the flow with the detected failure including a source and a destination;

identifying components associated with the first tenant based on the association information and located in the flow with the detected failure;

identifying a second tenant which provides a tenant service via a second flow passing through at least one of the identified components; and specifying the second flow through which the second tenant provides the tenant service as a control target flow.

* * * * *